Nov. 19, 1935.  F. W. JARVIS  2,021,859
DRIVING CONTROL FOR MOTOR VEHICLES
Filed Aug. 7, 1933   4 Sheets-Sheet 4

INVENTOR:
FRANKLIN W. JARVIS.
BY Baldwin Vale
ATTORNEY.

Patented Nov. 19, 1935

2,021,859

UNITED STATES PATENT OFFICE 2,021,859

DRIVING CONTROL FOR MOTOR VEHICLES

Franklin W. Jarvis, Oakland, Calif.

Application August 7, 1933, Serial No. 684,029

6 Claims. (Cl. 192—3)

This invention relates to driving controls for motor vehicles and more particularly to a combined brake and throttle control.

The principal object of the present invention is to control both the engine throttle and the brakes by the selective operation of a single pedal.

Another object is to arrange the apparatus to enable the operator's foot to assume effective positions for performance of the braking and accelerating operations.

Another object is to facilitate the moving of the pedal to braking position.

Another object is to provide for rapid reengagement of the pedal with the throttle control when the braking operation is completed.

Another object is to render the control adaptable to any of the several braking systems now in use.

A further object is to render the control unit inexpensive and compact in design and reliable in operation.

Other objects and advantages appear as this description progresses.

In this specification and the accompanying drawings, the invention is disclosed in its preferred form. It is, however, to be understood that the invention is not limited to this form because it may be embodied in other forms within the purview of the claims following the description.

In the accompanying four sheets of drawings.

Figure 1:
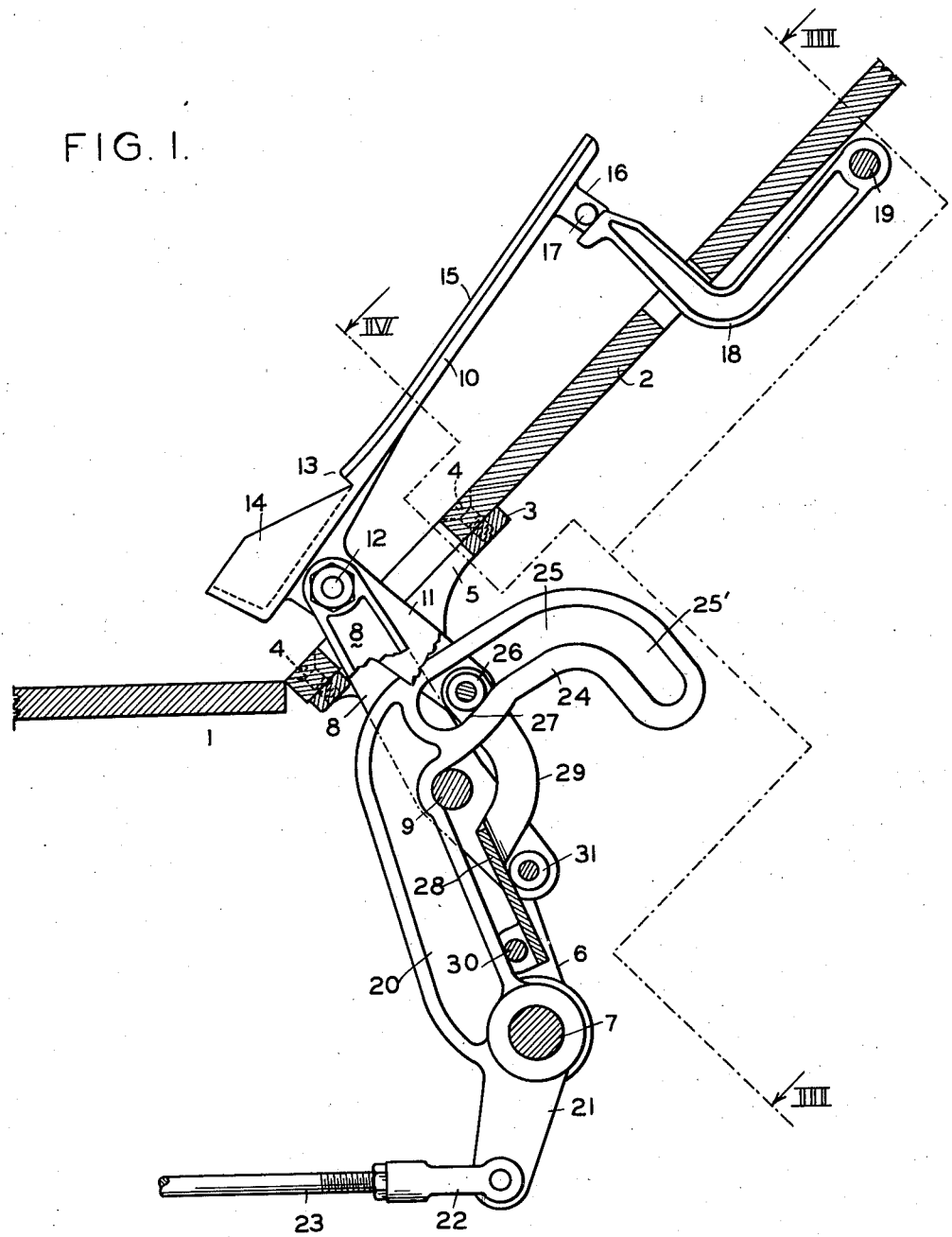
Fig. 1 is a side elevation, partly in vertical section of a control unit constructed in accordance with this invention.

In detail, the construction illustrated in the drawings comprises the usual horizontal floor board 1, with the inclined foot board 2 rising from the front end thereof. The bracket 3 is secured to the foot board 2 by the screws 4—4 and has the central opening 5 therethrough. The arms 6—6 extend downwardly from the bracket 3 and are mounted at their lower ends on the shaft 7. This shaft 7 served as the mounting for the brake pedal in prior installations.

The levers 8—8 pivot on the bolt 9 which extends between the spaced arms 6—6. The foot pedal 10 has the bifurcated arm 11 extending downwardly therefrom and pivots on the bolt 12 extending between the upper ends of the levers 8—8. The pedal 10 is shaped to be comfortable to the operator's foot and has the projection 13 thereon arranged to be engaged by the operator's heel for convenience in working the pedal. The flange 14 prevents accidental displacement of the foot and assists the foot in operating the pedal.

A rubber tread such as 15 may be provided in accordance with the usual practice.

Figure 6:
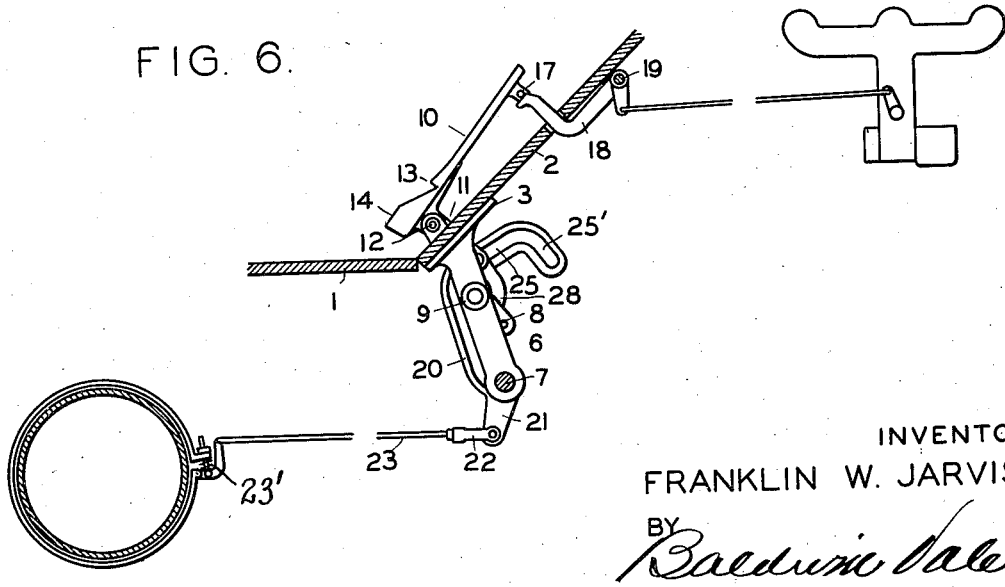
Fig. 6 is a diagrammatic view in side elevation of the control unit applied to a motor vehicle.

The lug 16 depends from the forward end of the pedal 10 and has the pin 17 projecting laterally therefrom. The throttle control lever 18 extends through the foot board 2 and has a flat end adapted to be operatively engaged by the pin 17. The lever 18 is fixed on the cross rod 19 which is connected to the engine throttle as suggested in Fig. 6.

The brake control lever 20 is pivoted on the shaft 7 between the spaced arms 6—6 and has the downwardly extending arm 21 which is engaged by the clevis 22 on the end of the rod 23. This rod can be arranged to operate any of the usual braking systems. In the present instance, it is adapted to operate mechanical brakes as diagrammatically illustrated in Fig. 6.

The upper end of the brake control lever extends laterally at 24 and has the guide slot 25 therein, the forward end of which curves downwardly at 25'. The roller 26 is mounted in the lower end of the bifurcated arm 11 and is confined within the guide slot 25. The roller rests in the depression 27 in the guide slot when the control unit is in the accelerating position illustrated in Fig. 1.

The floating lever 28 has a pair of arms 29 which are connected to the lower end of the bifurcated arm 11 and depends therefrom. The pressure pin 30 is mounted in suitable lugs on the floating lever and is adapted to impinge upon the side of the brake lever 20 near its pivot. The roller 31 is mounted between the lower ends of the levers 8—8 and is arranged to engage against the floating lever 28.

The invention operates substantially as follows: The control unit as shown in Fig. 1 is in its primary position with the pin 17 operatively engaging over the end of the throttle control lever. Pressure of the ball of the operator's foot swings the pedal on its pivot 12 and depresses the forward end thereof to operate the throttle lever 18. The depression 27 in the guide slot 25 is shaped to approximate an arc struck from the center 12. The roller 26 thus moves idly in the depression during the accelerating operation without affecting the position of the brake lever 20.

The levers 8—8 remain stationary during the accelerating operation. Accidental forward movement of these levers 8—8 is prevented by the roller 26 locking against the raised forward portion of the depression 27.

It has been found preferable to space the pedal 10 from the driver's seat the usual distance of the conventional accelerator pedal. The pedal 10 should be but slightly tilted with respect to the foot board 2. This enables the foot to assume a comfortable and effective position for acceleration.

Figure 2:
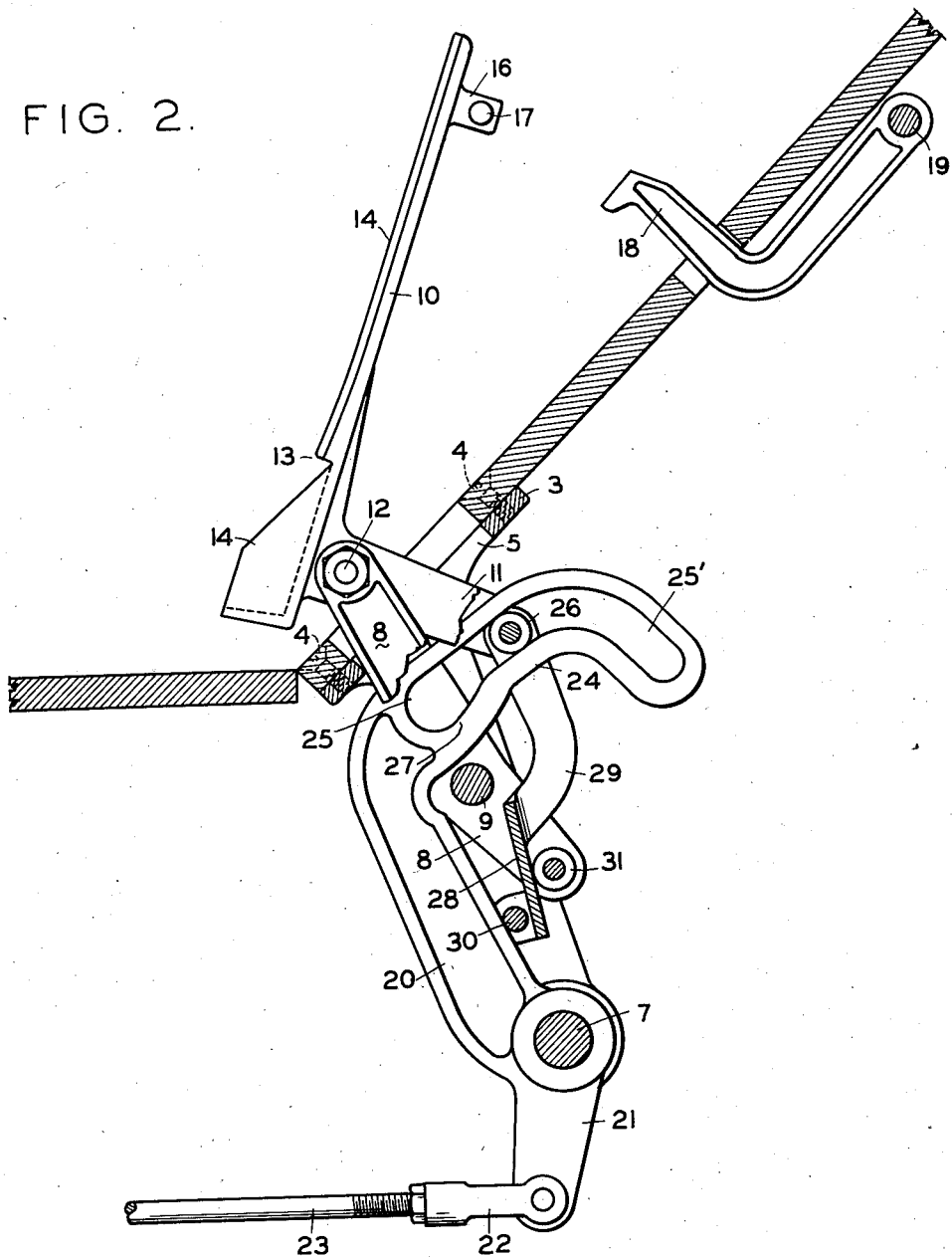
Fig. 2 is a similar view of the same in position for braking.

The control unit is advanced into the braking position shown in Fig. 2 by first tilting the pedal 10 backward on its pivot 12. The flange 14 cooperates with the operator's heel to facilitate the raising of the forward end of the pedal. This swings the roller 26 laterally out of the arcuate depression 27.

The tilting of the pedal 10 also removes the pin 17 from contact with the lever 18 thus completely disengaging the control unit from the engine throttle during the braking movement.

The movement of the roller 26 forces the floating lever 28, which is pivoted thereto, angularly against the fixed fulcrum 31 and pries the brake control lever 20 outward as shown in Fig. 2. The brake rod 23 is thus drawn forward sufficiently far to take the slack out of the brake mechanism as a preliminary to the actual application of the brakes. The swinging of the brake lever 20 also advances the roller 26 to the commencement of the downwardly curved portion 25' of the guide slot.

It is to be noted that the preliminary movement of the pedal 10 is in a direction reverse to that of acceleration. This insures against unintentional application of the brakes.

The tilting of the pedal 10 to raise the forward end thereof brings the pedal to a position analogous to the elevated position of the brake pedal in the conventional controls. This facilitates the exertion of sufficient physical power against the pedal to effectively operate the brakes.

The brakes are applied by pressing the pedal 10 straight forward to move the roller 26 along the downwardly curved portion 25' of the guide slot. This swings the levers 8—8 on their pivot 9 and synchronously tilts the pedal 10 downward on its pivot 12.

Figure 3:
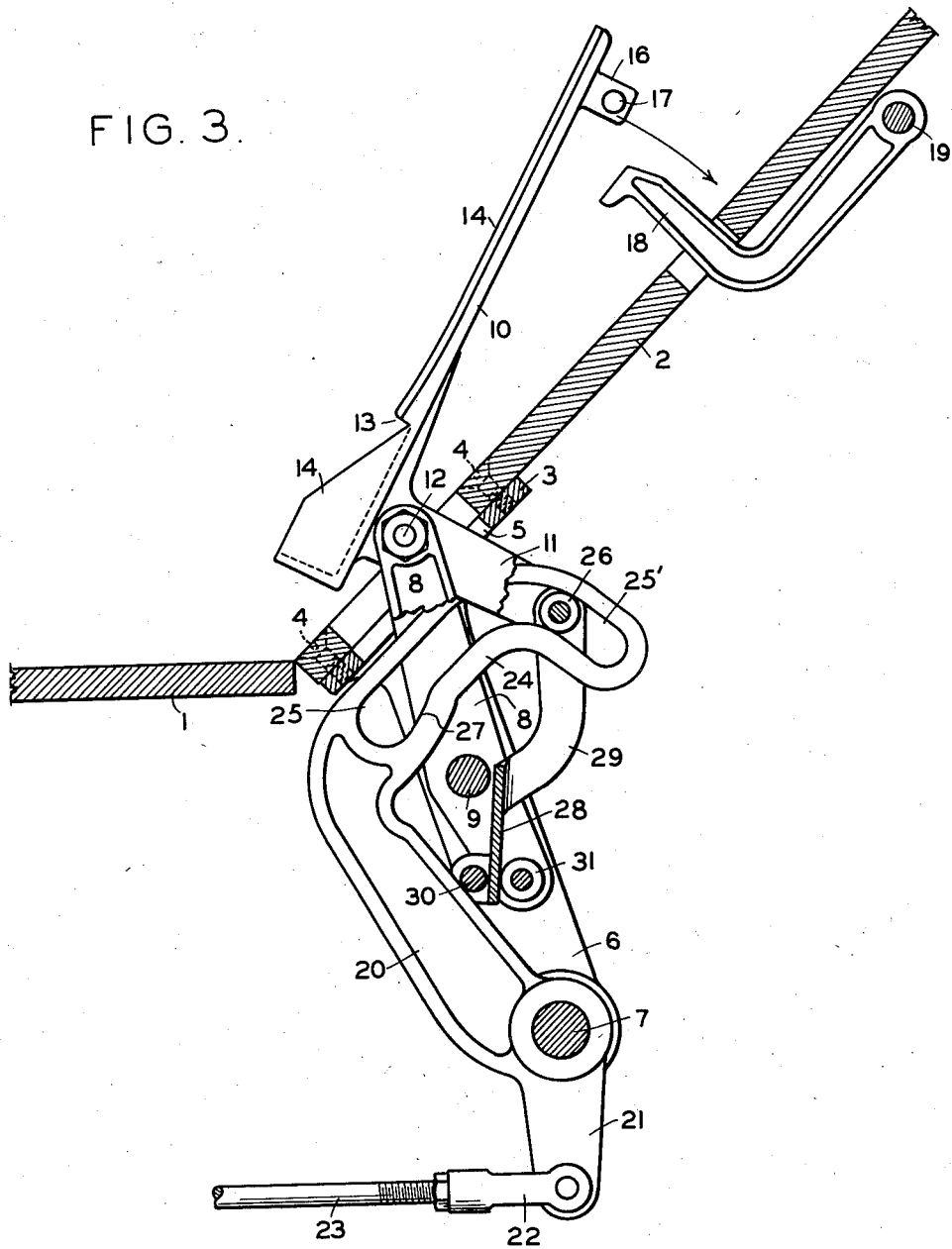
Fig. 3 is a similar view of the same during the braking operation.
Figure 4:
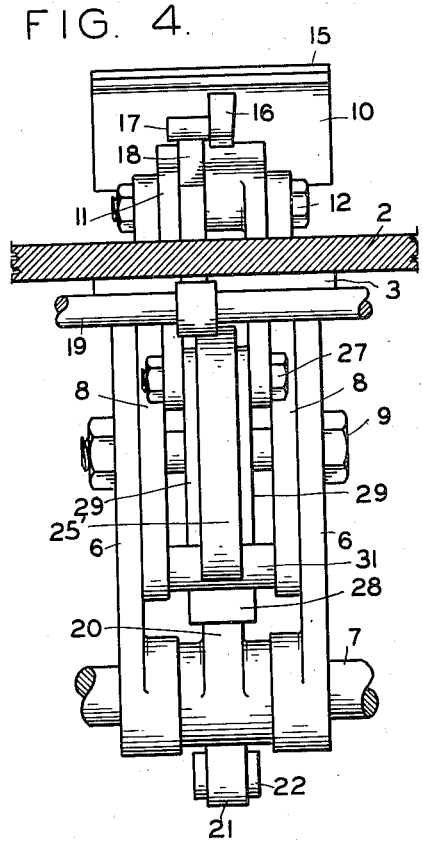
Fig. 4 is a transverse vertical section of the same taken along the line III—III in Fig. 1.
Figure 5:
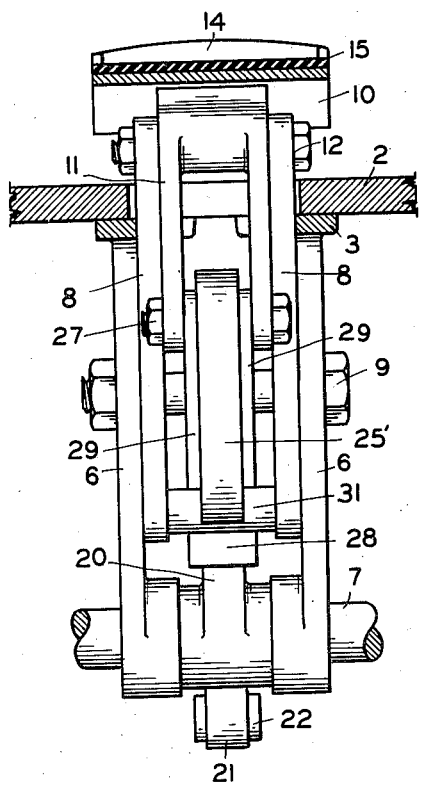
Fig. 5 is a similar view of the same taken along the line IV—IV in Fig. 1.

The movement of the levers 8—8 presses the roller 31 against the floating lever 28. This further swings the brake control lever 20 on its pivot in the conventional manner. It will be observed that the preliminary braking movement of the pedal 10 raises the floating lever 28 upward (compare Figs. 1 and 3). This moves the pressure pin 30 outward from the pivot 7 of the brake control lever. This increases the leverage exerted against the brake control lever by the roller 31.

The synchronous tilting of the pedal 10 on its pivot 12 is automatically effected by the brake control lever 20 swinging on its pivot and laterally moving the roller 26 which is confined in the downwardly curved portion 25' of the guide slot.

The lateral swing of the roller 26 moves the floating lever 28 which is hinged thereto. The roller 31 resists any downward movement of the floating lever 28 (see Fig. 3). This converts the arm 11 and the floating lever into a toggle joint which operates to forcefully engage the pin 30 against the side of the brake control lever 20. The consequent movement of the brake lever completes the application of the brakes. The relatively powerful leverage obtained by the toggle joint assures the accurate application of the brakes with the minimum of physical effort.

The control unit is restored to its initial position, as shown in Fig. 1, by removing the foot pressure from the pedal 10. The usual spring tension of the brake mechanism as indicated at 23' will then restore the brake control lever to its normal position. This forces the roller 26 upward out of the curved portion 25' of the guide slot and returns the levers 8—8 to their initial position. The pedal 10 is then restored to its original position with the roller 26 resting in the arcuate depression 27. The pin 17 re-engages the end of the throttle lever 18 preparatory to acceleration.

Having thus described the invention, what is claimed and desired to be secured by Letters Patent is:

1. A control for motor vehicles including brake and throttle control members, a mounting; a foot pedal pivoted on said mounting and having an arm extending therefrom; a floating lever pivoted on said arm and arranged to operate said brake control member; and means actuated by said pedal adapted to operate said throttle control member and disengageable therefrom during the braking operation.

2. A control for motor vehicles including brake and throttle control members, a bracket; a lever mounted on said bracket; a pedal pivoted on said lever and having an arm extending therefrom; a floating lever pivoted on said arm and adapted to operatively engage said brake control member; and means actuated by said pedal for operating said throttle control member and disengageable therefrom during the braking operation.

3. A control for motor vehicles including brake and throttle control members, a bracket; a lever mounted on said bracket; a pedal pivoted at the upper end of said lever and having an arm extending therefrom; a floating lever pivoted on said arm and interposed between the lower end of said lever and said brake control member; and means actuated by said pedal for operating said throttle control member and disengageable therefrom during the braking operation.

4. A control for motor vehicles including brake and throttle control members, a bracket; a lever mounted on said bracket; a pedal pivoted on said lever and having an arm extending therefrom; said brake control member having a guide slot therein; a roller on said arm confined in said guide slot; a floating lever pivoted on said arm and adapted to operatively engage said brake control member; and means actuated by said pedal for operating said throttle control member and disengageable therefrom during the braking operation.

5. A control for motor vehicles including brake and throttle control members, a bracket; a lever mounted on said bracket; a pedal pivoted on the upper end of said lever and having an arm extending therefrom; said brake control member having a guide slot therein; a roller on said arm confined in said guide slot; a floating lever pivoted on said arm and interposed between the lower end of said lever and said brake control member; and means actuated by said pedal for operating said throttle control member and disengageable therefrom during the braking operation.

6. A control for motor vehicles including brake and throttle control members, a bracket; a lever mounted on said bracket; a pedal pivoted on said lever and having an arm extending therefrom; said brake control member having a guide slot therein; a roller on said arm confined within said guide slot; a floating lever pivoted on said arm and adapted to operate said brake control member; and means actuated by said pedal for operating said throttle control member and disengageable therefrom during the braking operation.

FRANKLIN W. JARVIS.